US006444756B2

(12) United States Patent
Chan et al.

(10) Patent No.: US 6,444,756 B2
(45) Date of Patent: *Sep. 3, 2002

(54) DISPERSION-CONTROLLED POLYMERS FOR BROAD BAND FIBER OPTIC DEVICES

(75) Inventors: Kwok Pong Chan, Troy; David G. Gascoyne, Schenectady; Gregory A. Wagoner, Watervliet, all of NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/896,709

(22) Filed: Jun. 29, 2001

Related U.S. Application Data (60) Continuation of application No. 09/692,067, filed on Oct. 19, 2000, now Pat. No. 6,303,695, which is a division of application No. 09/139,457, filed on Aug. 25, 1998, now Pat. No. 6,191,224.

(51) Int. Cl.$^7$ .................................................. C08F 8/00
(52) U.S. Cl. ....................... 525/195; 525/191; 524/403; 524/405; 358/901.1; 428/113; 428/288; 428/290
(58) Field of Search ................................ 525/195, 191; 524/403, 405; 358/901.1; 428/113, 288, 290; 125/195, 191

(56) References Cited

U.S. PATENT DOCUMENTS

| 4,060,308 A | 11/1977 | Barnoski et al. ......... 350/96 C |
| 4,201,446 A | 5/1980 | Geddes et al. ........... 350/96.29 |
| 4,343,532 A | 8/1982 | Palmer .................... 350/96.19 |

(List continued on next page.)

FOREIGN PATENT DOCUMENTS

| DE | 4005557 A1 | 8/1991 |
| DE | 4343943 A1 | 6/1995 |
| EP | 0229456 A2 | 7/1987 |
| EP | 0 488 266 A2 | 6/1992 |
| EP | 0686867 A1 | 12/1995 |
| GB | 2 184 859 A | 7/1987 |

(List continued on next page.)

OTHER PUBLICATIONS

Wagoner et al., pending U.S. patent application Ser. No. 09/139,832, filed Aug. 25, 1998, entitled "Blockless Techniques for Simultaneous Polishing of Multiple Fiber Optics".

Johnstone, W. et al., "Fibre Optic Modulators Using Active Multimode Waveguide Overlays" *Electronics Letters*, vol. 27, No. 11, pp. 894–896 (May 23, 1991).

Johnstone, W. et al., "Fiber–Optic Fefractometer that Utilizes Multimode Waveguide Overlay Devices," *Optics Letters*, vol. 17, No. 21, pp. 1538–1540 (Nov. 1, 1992).

(List continued on next page.)

*Primary Examiner*—Duc Truong
(74) *Attorney, Agent, or Firm*—Heslin Rothenberg Farley & Mesiti P.C.; Martha L. Boden, Esq.

(57) ABSTRACT

Novel polymer compositions for controlling or correcting dispersion mismatch between the composition and a side-fiber polished optical fiber are disclosed. The polymer compositions contain an infrared absorbing dye having an absorption maximum from about 900 to about 1200 nm and and a polar olefin copolymer containing monomers which are formed from polar olefins having an ester, benzene, or halogen substitutent attached. A method for controlling the dispersion exhibited by the novel polymer compositions is also disclosed. The method includes forming the polymer composition over an exposed surface of an optical fiber. Dispersion is controlled by controlling the amount of dye present in the polymer composition. Also disclosed is an optical device from which improvements in the uniformity of spectral response and performance are observed across a wavelength band. The optical device includes the polymer composition formed over an optical fiber. Variable optical attenuators, switches, and couplers can be designed which incorporate the polymer compositions. The invention is particularly useful in the 1500–1600 nm wavelength band.

25 Claims, 5 Drawing Sheets

U.S. PATENT DOCUMENTS

| | | | | |
|---|---|---|---|---|
| 4,387,954 | A | 6/1983 | Beasley | 350/96.15 |
| 4,469,544 | A | 9/1984 | Goodman | 156/345 |
| 4,469,554 | A | 9/1984 | Turner | 156/657 |
| 4,630,884 | A | 12/1986 | Jubinski | 350/96.15 |
| 4,630,890 | A | 12/1986 | Ashkin et al. | 350/96.3 |
| 4,704,151 | A | 11/1987 | Keck | 65/4.1 |
| 4,712,866 | A | 12/1987 | Dyott | 350/96.3 |
| 4,753,497 | A | 6/1988 | Fujii et al. | 350/96.15 |
| 4,773,924 | A | 9/1988 | Berkey | 65/3.11 |
| 4,778,237 | A | 10/1988 | Sorin et al. | 350/96.15 |
| 4,786,130 | A | 11/1988 | Georgiou et al. | 350/96.15 |
| 5,060,307 | A | 10/1991 | El-Sherif | 359/173 |
| 5,067,788 | A | 11/1991 | Jannson et al. | 385/2 |
| 5,078,465 | A | 1/1992 | Dahlgren | 385/50 |
| 5,091,984 | A | 2/1992 | Kobayashi et al. | 385/16 |
| 5,106,394 | A | 4/1992 | Bramson | 51/309 |
| 5,108,200 | A | 4/1992 | Nonaka et al. | 385/16 |
| 5,135,555 | A | 8/1992 | Coyle, Jr. et al. | 65/12 |
| 5,136,818 | A | 8/1992 | Bramson | 51/165.72 |
| 5,265,178 | A | 11/1993 | Braun et al. | 385/24 |
| 5,290,398 | A | 3/1994 | Feldman et al. | 156/651 |
| 5,351,319 | A | 9/1994 | Ginder et al. | 385/6 |
| 5,493,629 | A | 2/1996 | Stange | 385/125 |
| 5,623,567 | A | 4/1997 | Barberio et al. | 385/30 |
| 5,673,351 | A | 9/1997 | Clarke et al. | 385/100 |
| 5,781,675 | A | 7/1998 | Tseng et al. | 385/30 |
| 5,966,493 | A | 10/1999 | Wagoner et al. | 385/140 |
| 6,011,881 | A | 1/2000 | Moslehi et al. | 385/10 |
| 6,191,224 | B1 | 2/2001 | Chan et al. | 525/195 |
| 6,205,280 | B1 | 3/2001 | Wagoner et al. | 385/140 |
| 6,268,435 | B1 * | 7/2001 | Chan et al. | 525/195 |
| 6,303,695 | B1 * | 10/2001 | Chan et al. | 525/195 |

FOREIGN PATENT DOCUMENTS

| | | |
|---|---|---|
| GB | 2190211 A | 11/1987 |
| JP | 60-203904 | 10/1985 |
| JP | 06-114713 | 4/1994 |
| WO | WO 87/03676 | 6/1987 |
| WO | WO 89/01171 | 2/1989 |
| WO | WO 95/05617 | 2/1995 |

OTHER PUBLICATIONS

McCallion, K. et al., "Investigation of Optical Fibre Switch Using Electro–Optic Interlays" *Electronic Letters*, vol. 28, No. 4, pp. 410–411 (Feb. 13, 1992).

Zhang, M. et al., "Single–mode fiber–film directional coupler" *Journal of Lightwave Technology*, vol. LT–5, No. 2, pp. 260–264 (Feb. 1987).

R.P. Pan et al., "Voltage–Controlled Optical Fiber Coupler Using a Layer of Low–Refractive Index Liquid Crystal with Positive Dielectric Anisotropy," *Jpn. J. Appl. Phys.* 34, Part 1, 6410–6415 (1995).

M. J. F. Digonnet et al., "Measurement of the Core Proximity in Polished Fiber Substrates and Couplers," *Optics Letters* 10, 463–465 (1985).

O. G. Leminger & R. Zengerle, "Determination of Single–Mode Fiber Coupler Design Parameters from Loss Measurements," *IEEE Journal of Lightware Technology* LT–3, 864–867 (1985).

M.H. Cordaro et al., "Precision Fabrication of D–Shaped Single–Mode Optical Fibers by In Situ Monitoring," *IEEE Journal of Lightware Technology* 12, 1524–1531 (1994).

J. Gowar, *Optical Communication Systems*, ch. 3, 58–77 (2d. ed. 1993).

U.T. Mueller–Westerhoff et al., "The Synthesis of Dithiolene Dyes with Strong Near–IR Absorption", *Tetrahedron* 47, 909–932 (1991).

Bergh, R. A. et al., "Single–Mode Fibre Optic Directional Coupler," *Electron. Lett.* 16 (7), 260–261 (Mar. 1980).

Birks, T.A. and Li, Y.W., "The Shape of Fiber Tapers," *IEEE J. Lightwave Techn.* 10 (4), 432–438 (Apr. 1992).

Brophy, T.J. et al., "Formation and Measurement of Tapers in Optical Fibers," *Rev. Sci. Instrum.* 64 (9), 2650–2654 (Sep. 1993).

Carrara, S. L. A. et al., "Elasto–Optic Alignment of Birefringent Axes in Polarization–Holding Optical Fiber," *Opt. Lett.* 11 (7), 470–472 (Jul. 1986).

Diez A. et al., "Cynlindrical Metal–Coated Optical Fibre Devices for Filters and Sensors," *Electron. Lett.* 32 (15), 1390–1392 (Jul. 1996).

Hussey, C.D. and Minelly, J.D., "Optical Fibre Polishing with a Motor–Driven Polishing Wheel," *Electron. Lett.* 805–807 (Jun. 1988).

Kenny, R.P. et al., "Control of Optical Fibre Taper Shape," *Electron. Lett.* 27 (18), 1654–1656 (Aug. 1991).

Love, J.D. and Henry, W.M. "Quantifying Loss Minimisation in Single–Mode Fibre Tapers," *Electron. Lett.* 22 (17), 912–914 (Aug. 1986).

McCallion, K. J. and Shimazu, M., "Side–Polished Fiber Provides Functionality and Transparency," *Optoelectronics World*, S19, S20, S22 and S24 (Sep. 1998).

Morozov V. et al., "Fused Fiber Optic Variable Attenuator," *OFC 2000, 25th Annual Optical Fiber Commincations Conference*, 22–24 (Mar. 10, 2000).

Parriaux, O. et al., "Distributed Coupling on Polished Single–Mode Optical Fibers," *Appl. Opt.* 20, 2420–2423 (Jul. 1981).

Todd, D.A. et al., "Polarization–Splitting Polished Fibre Optic Couplers," *Optical Engineering* 32 (9), 2077–2082 (Sep. 1993).

\* cited by examiner

DISPERSION-CONTROLLED POLYMERS FOR BROAD BAND FIBER OPTIC DEVICES

CROSS-REFERENCE TO RELATED APPLICATIONS

This Application is a continuation of earlier copending U.S. patent application Ser. No. 09/692,067, filed Oct. 19, 2000 now U.S. Pat. No. 6,308,695, which is a divisional of U.S. patent application Ser. No. 09/139,457, filed Aug. 25, 1998, now issued as U.S. Pat. No. 6,191,224 on Feb. 20, 2001; and this Application is related to U.S. patent application Ser. No. 09/139,787, filed Aug. 25, 1998, now issued as U.S. Patent No. 6,205,280 on Mar. 20, 2001, and entitled "BLOCKLESS FIBER OPTIC ATTENUATORS AND ATTENUATION SYSTEMS EMPLOYING DISPERSION CONTROLLED POLYMERS"; and to U.S. patent application Ser. No. 09/139,832, filed Aug. 25, 1998 now U.S. Pat. No. 6,374,071, and entitled "BLOCKLESS TECHNIQUES FOR SIMULTANEOUS POLISHING OF MULTIPLE FIBER OPTICS."

Each of these Applications/Patents is hereby incorporated by reference in its entirety.

TECHNICAL FIELD

The present invention relates to polymeric materials formulated to control optical dispersion, and more particularly, to the use of these dispersion-controlled polymeric formulations in broadband fiber optic device applications.

BACKGROUND OF THE INVENTION

Dense wavelength division multiplexed (DWDM) optical networks increase their transmission capacity by employing multiple co-propagating, discrete, wavelength channels, each carrying independent data streams. Broadband fiber optic devices, such as variable attenuators, couplers, and switches having a controllable spectral response, are critical components of DWDM systems. Currently, DWDM systems operate in the 1550 nm spectral region because of the availability of optical amplifiers containing erbium-doped optical fibers. However, as amplifier technology develops, and capacity demands increase, DWDM systems are expected to expand their spectral extent and increase their channel density.

Optical power, as it propagates in a single-mode optical fiber, or any other waveguide or bulk material, experiences dispersion, i.e. differing wavelengths propagate at different speeds. In an optical fiber, modal extent and phase velocity are affected by both the dispersion of the material (material dispersion) and the dispersion of the waveguide (waveguide dispersion) causing the light to pass through at different speeds. Thus, across a given wavelength region, differences between the dispersions of the material and waveguide through which light propagates can result in nonuniform spectral performance of fiber-based devices.

Dispersion is often represented in terms of a material's refractive index (n) as a function of optical wavelength ($\lambda$), i.e. as $n(\lambda)$. In dispersive materials, the refractive index of the material changes with wavelength. The relevant parameter when describing modal dispersion or multimode distortion in optical fibers is the effective mode index, also referred to herein as "effective mode dispersion", $n_{eff}(\lambda)$, which, in simple waveguide geometries, can be calculated using the material dispersion of the fiber's cladding and core, $n_{clad}(\lambda)$ and $n_{core}(\lambda)$, respectively, and geometric parameters. Sellmeier dispersion equations for the cladding and core in a single mode optical fiber are provided by J. Gowar, in *Optical Communication Systems*, ch. 3, 58–77 (2d ed. 1993). For a glass fiber, the material dispersions for the cladding and core are calculated from the following Sellmeier equations (1a) and (1b), respectively, which are valid from 0.3–3.0 $\mu m$:

$$n^2_{clad}(\lambda[\mu m]) - 1 = \frac{0.6962\lambda^2}{(\lambda^2 - 0.0684^2)} + \frac{0.4970\lambda^2}{(\lambda^2 - 0.1162^2)} + \frac{0.8975\lambda^2}{(\lambda^2 - 9.8962^2)} \quad (1a)$$

$$n^2_{core}(\lambda[\mu m]) - 1 = \frac{0.7192\lambda^2}{(\lambda^2 - 0.0709^2)} + \frac{0.3988\lambda^2}{(\lambda^2 - 0.1157^2)} + \frac{0.9099\lambda^2}{(\lambda^2 - 9.9093^2)} \quad (1b)$$

Figure 1:
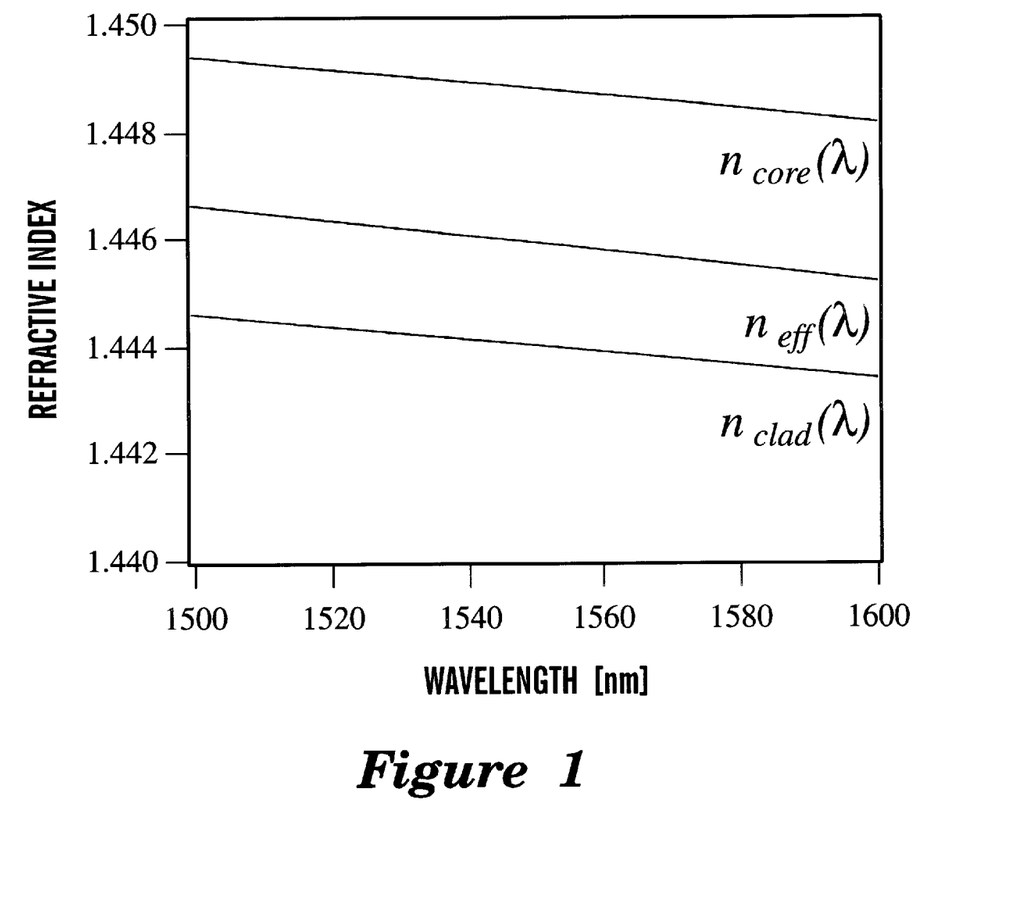
FIG. 1 is a graph of refractive index versus wavelength (nm) depicting the dispersions of the cladding and core for a glass optical fiber, and its effective mode dispersion.

The dispersions of the cladding, $n_{clad}(\lambda)$, and core, $n_{core}(\lambda)$, and the effective mode dispersion, $n_{eff}(\lambda)$ for a silica glass optical fiber having a core with a slightly raised refractive index relative to the surrounding cladding are plotted in FIG. 1. Although all materials are dispersive to some extent, a hypothetical material exhibiting no dispersion would be represented in the graph of FIG. 1 as a horizontal line. The greater the dispersion, the steeper the slope (negative or positive). As used herein, the term "dispersion" refers to the slope of the line formed from a plot of a material's change in refractive index versus change in wavelength. As can be seen from the slope of $n_{eff}(\lambda)$ in FIG. 1, a single mode optical fiber is dispersive.

Figure 2A:
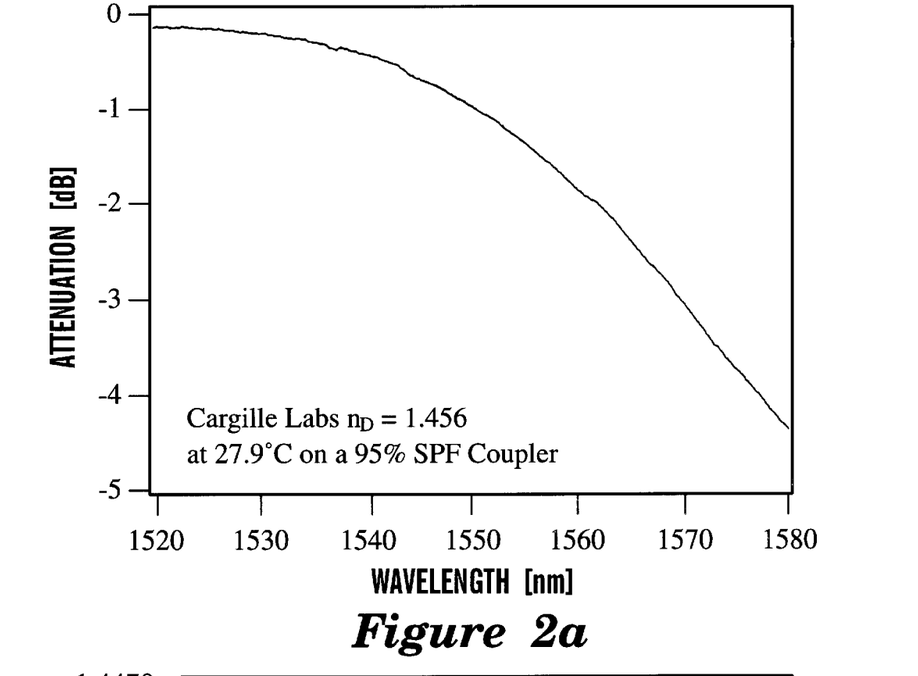
FIG. 2a is a graph depicting attenuation in decibels versus wavelength (nm) for a SPF coupler having a 95% polished cladding level and a coupling oil (Cargille Labs, $n_D$=1.456)

Because the effective mode index is dispersive, fiber-based devices may exhibit spectrally non-uniform performance, which is undesirable for many broadband device applications. An example of this is a side-polished fiber (SPF)-based attenuator. Cargille Refractive Index Liquids, which may be coupled onto the attenuator, each have a well-characterized refractive index, $n_D$, where subscript D denotes the Sodium D-Line wavelength ($\lambda$=589 nm), and a well-characterized dispersion curve. As disclosed in copending commonly assigned U.S. application Ser. No. 09/026,755 entitled "Fiber Optic Attenuators and Attenuation Systems", the disclosure of which is incorporated herein by reference, placing a coupling oil ($n_D$=1.456 at 27.9° C.) on a SPF coupler induces power loss (attenuation). FIG. 2a is a plot of attenuation (optical energy transmission) in decibels versus wavelength (1520–1580 nm) for a SPF coupler having a 95% polished cladding level. As shown in FIG. 2a, the attenuation is not uniform across the spectral region. This spectral nonuniformity is observed because the dispersion of the oil, $n_{oil}(\lambda)$, which is calculated from equation (2) as $$n_{oil}(\lambda[\text{Å}]) = 1.44418 + \frac{401173.2}{\lambda^2} + \frac{3.18914 \cdot 10^{11}}{\lambda^4} - 3.89 \cdot 10^{-4}(T[°\text{C.}] - 25) \quad (2)$$

Figure 2B:
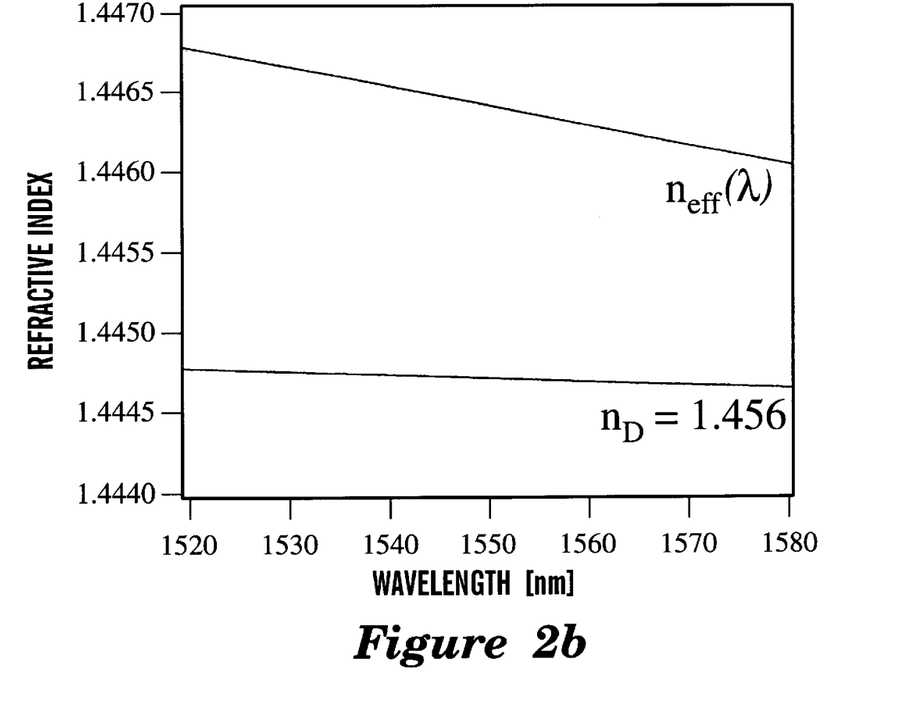

(where T is the temperature) is mismatched to that of the fiber, $n_{eff}(\lambda)$. This dispersion mismatch is depicted in FIG. 2b, where the slope of $n_{oil}(\lambda)$ differs from that of $n_{eff}(\lambda)$. By contrast, if the dispersion of the oil matched that of the fiber, the graphic representations of the corresponding dispersions would be approximately parallel, and the attenuation would be almost constant or substantially uniform across the wavelength band with only small variations being observed.

As disclosed in the aforementioned U.S. application Ser. No. 09/026,755, certain organic polymers having an index of refraction close to that of the fiber can be applied to the exposed surface of a SPF optic for use in variable optical attenuators (as described below). Such polymers exhibit a change in refractive index proportional to a change in temperature. OPTI-CLAD® 145, which is available from Optical Polymer Research, Inc. is an example of such a polymer. Although the refractive index of such organic polymer materials can be altered at a given wavelength to match that of the fiber, the use of known polymers is limited in broadband applications because of the dispersion mismatch between the polymer and the fiber across the wavelength band of interest.

Control over the spectral response of a broadband fiber optic device can be strongly dependent on the dispersion mismatch between the fiber and any coupling materials present. Therefore, polymer formulations are desirable that would allow not only control of the refractive index of the polymer overlying the optical fiber, but also control of the dispersion properties of the polymer. Such dispersion control would permit correction of the polymer's dispersion to substantially match that of the fiber and, alternatively, would allow the dispersion of the polymer to be controllably altered from that of the fiber. Such dispersion controllable materials would be useful in broadband applications, such as in the 1500–1600 nm region, where control of spectral response is important. In addition, dispersion controllable polymer materials would be useful in the fabrication of many broadband fiber optic devices, such as variable optical attenuators (VOAs), couplers, and switches.

SUMMARY OF THE INVENTION

The present invention meets the aforementioned needs and is based on the unexpected discovery that certain polar polyolefin polymers doped with infrared absorbing dyes having an absorption maximum from 900 to 1200 nm can be formulated to correct or control dispersion mismatch between the polymer and a fiber optic. The dye additives are used to control the dispersion from almost no difference in dispersion between the polymer composition and the fiber optic to very strong differences in dispersion. In addition, the refractive index of the novel polyolefin compositions of the present invention can be controlled and can be altered to match or differ from that of the optical fiber. The novel dispersion-controlled polymer compositions of the present invention are particularly useful in the fabrication of spectrally uniform fiber optic devices such as VOAs, couplers, and switches for use in the 1500–1600 nm region.

Accordingly, in one aspect, the present invention is a dispersion-controlled polymer composition comprising:

(a) from about 0.2 to about 4% by weight of an infrared absorbing dye having an absorption maximum from about 900 to about 1200 nm; and (b) from about 96.0 to about 99.8% by weight of a polar olefin copolymer comprising monomeric units derived from two or more polar olefins having an ester, benzene, or halogen substituent attached thereto.

The polar olefin copolymer preferably has a molecular weight from about 1,500 to about 100,000 g/mole, with an upper limit of about 50,000 g/mole being more preferable, and an upper limit of about 5,500 g/mole being the most preferable.

The infrared absorbing dye is preferably:

(8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate or a metal complex dye having the general formula bis[1,2-[(4-alkyl$^1$ alkyl$^2$ amino)phenyl]-1,2-ethylenedithiolate]Met. Alkyl$^1$ and alkyl$^2$ are each independently lower alkyls containing 2 to 8 carbon atoms. In addition, alkyl$^1$ may differ from or may be the same as alkyl$^2$. Met is a Group IIIB metal, preferably nickel, palladium or platinum. The most preferable metal complex dyes include bis[1,2-(4-dibutylaminophenyl)-1,2-ethylenedithiolate]nickel; bis[1,2-[4-(ethyl heptyl amino) phenyl]-1,2-ethylenedithiolate]nickel; bis[1,2-(4-dibutylaminophenyl)-1,2-ethylenedithiolate]platinum; and bis[1,2-[4-(ethyl heptyl amino)phenyl]-1,2-ethylenedithiolate]platinum.

The polar olefins, from which the monomeric units of the copolymer are derived, are preferably selected from, but not limited to:

tetrafluoropropyl acrylate, tetrafluoropropyhnethacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride.

In another aspect, the present invention is a method for controlling dispersion in the aforementioned novel polymer composition across a wavelength band, the most preferable wavelength band being from about 1500 nm to about 1600 nm. The first step of the method is providing a portion of an optical fiber through which optical energy can propagate. The portion of the optical fiber has material removed from it, thereby exposing a surface thereof The portion of the optical fiber has an effective mode refractive index at each wavelength of the wavelength band and an effective mode dispersion across the wavelength band.

In the second step of the method, the polymer composition is formed over the exposed surface of the portion of the optical fiber. The polymer composition has a material refractive index at each wavelength of the wavelength band and a material dispersion across the wavelength band. By altering the amount of the infrared absorbing dye present in the polymer composition, the material dispersion across the wavelength band is controlled to substantially match or mismatch the effective mode dispersion of the optical fiber. Also, the amount of dye, as well as the particular polyolefin contained in the polymer composition, controls the material refractive index at each wavelength. For substantial broadband dispersion matching, two conditions must be met: 1) the material refractive index of the polymer composition must be substantially the same as the effective mode refractive index; and 2) the change in refractive index across the wavelength band of interest (i.e. slope) must be substantially the same for both the optical fiber and the polymer composition. For example, a polymer composition which is substantially dispersion-matched with an optical fiber preferably has a material refractive index which is controlled to lie within about 0.5% of the effective mode refractive index, more preferably within about 0.2%, and most preferably within about 0.15%. In addition, to substantially match the dispersion of the fiber optic, the change in material refractive index with wavelength is, for example, preferably within about 25% of the change in effective mode refractive index across the wavelength band of interest.

The method may optionally include the step of altering the material refractive index to a desirable refractive index without changing the material dispersion. This may be accomplished by controllably changing the temperature of the polymer composition formed on the surface of the optical fiber.

In another aspect, the present invention is an optical device comprising a portion of an optical fiber having material removed therefrom, thereby exposing a surface thereof, and the novel polymer composition formed over the exposed surface of the optical fiber. Optical energy or light transmitted through the fiber can propagate through or be extracted from the exposed surface. The spectral response of the optical device across a wavelength band of interest may be controlled by controlling the material dispersion relative to the effective mode dispersion. For uniform spectral response, the material dispersion substantially matches the effective mode dispersion.

In addition, the optical device may optionally include a temperature controlling circuit coupled to the polymer composition, wherein the temperature controlling circuit provides a controllable stimulus to the polymer composition to change the temperature thereof The temperature of the polymer composition affects the material refractive index without altering the material dispersion or the spectral response of the device.

Based on the present invention, dispersion mismatch between an overlying polymer and an optical fiber can be controlled and corrected, if desired. This control is possible through modification of the composition of the polymer overlay using an infrared absorbing dye, as described above. In addition, improvement in spectral performance across a wavelength band is possible. The availability of the present dispersion and refractive index controlled polymer compositions can be used to develop novel fiber optical devices, such as attenuators, switches, and couplers.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIG. 2b is a graph of refractive index versus wavelength (nm) depicting the dispersion mismatch between the optical fiber and the coupling oil of the SPF coupler of FIG. 2a;

FIG. 5b is an end cross-sectional view of the optical device of FIG. 5a.

DESCRIPTION OF THE PREFERRED EMBODIMENTS

The present invention relates to novel polymer compositions in which dispersion can be controlled, a method for controlling dispersion of the polymer compositions when overlaid on an exposed portion of an optical fiber, and an optical device for controlling the optical power level with a uniform spectral response. The novel polymer compositions of the present invention are particularly useful in controlling the spectral response of fiber optic based devices within the wavelength band of 1500–1600 nm.

The polar olefin polymers included in the novel polymer compositions of the present invention are copolymers containing monomeric units which are derived from two or more polar olefins having an ester, benzene, or halogen substituent attached thereto. As used herein, the term "polar" refers to the property in which the positive and negative electrical charges of the olefin monomers are permanently separated, and the term "olefin" refers to the class of unsaturated aliphatic hydrocarbons having one or more double bonds. Polar olefin copolymers, also referred to herein as "polyolefins", are easily synthesized from a variety of commercially available polar olefin monomers using conventional polymerization reactions, such as the one described below.

Illustrative useful monomers for inclusion in the polyolefins include the preferred polar olefins listed above. Generally, for use in controlling dispersion, a polyolefin is desired which has a refractive index, referred to herein as "base refractive index" that is close to, but lower than, that of the optical fiber (effective mode refractive index, $n_{eff}$). The effective mode refractive index is dependent upon the fiber core and cladding indices, and the fiber core dimensions, but usually lies between the core and cladding refractive indices. For a standard glass fiber optic having an 8.3 μm diameter core region of slightly raised refractive index surrounded by a 125±1 μm fused silica cladding, the effective mode refractive indices are shown in FIG. 1 for the wavelength band from 1500 to 1600 nm. At 1500 nm, $n_{eff}$ is about 1.4466, and at 1600 nm, $n_{eff}$ is about 1.4455. Typically, the base refractive index of the undoped polyolefin has a value within about 1% of the effective mode refractive index.

Table 1 provides refractive index values, $n_D$, where subscript D denotes the Sodium D-Line wavelength ($\lambda$=589 nm), for a variety of polar olefin monomers at room temperature (20–25° C.). Within a wavelength band of interest, blends of olefin monomers can be used for precise control of the refractive index of the resulting polymer. More particularly, the base refractive index of the polymer at each wavelength within the band can be controlled by adjusting the ratio and types of olefin monomers included in the polyolefin. Thus, there are many possible combinations and amounts of polar olefins that can be used to form polar polyolefins having the desirable base refractive index. The relative amounts of polar olefin monomers contained in the polyolefin can be represented as ratios or in terms of percent by weight ("% by weight" or "wt. %"). It should be noted that the invention is not limited to the use of the monomers listed above and in Table 1, and additional useful polar olefin monomers having an ester, benzene or halogen substituent attached thereto that can be used to obtain the desirable base refractive index would be obvious to one of skill.

TABLE 1

| Monomer Description | Refractive Index ($n_n$) |
| --- | --- |
| tetrafluoropropyl acrylate | 1.400 |
| tetrafluoropropylmethacrylate | 1.400 |

TABLE 1-continued

| Monomer Description | Refractive Index ($n_n$) |
|---|---|
| butyl acrylate | 1.418 |
| hexyl acrylate | 1.428 |
| trifluoroethyl methacrylate | 1.437 |
| lauryl acrylate | 1.445 |
| pentafluorostyrene | 1.450 |
| pentafluorophenyl acrylate | 1.470 |
| methyl acrylate | 1.472 |
| N,N-dimethylacrylamide | 1.473 |
| pentafluorophenyl methacrylate | 1.487 |
| methyl methacrylate | 1.489 |
| vinylidene chloride | 1.600 |

In addition, the refractive index of the resulting polar olefin copolymer can be altered by heating or cooling the polymer to a temperature above or below its initial temperature or by controlling the molecular weight of the polymer. An increase in the temperature of the polymer will lower the refractive index, and a decrease in the temperature of the polymer will increase the refractive index. The molecular weight of the polyolefin can be regulated by controlling the amount of chain terminating agent added during polymerization, as discussed below. To be useful, the novel polar olefin polymer compositions of the present invention preferably contain polyolefins having a molecular weight (Mw) from about 1,500 g/mole to about 100,000 g/mole. However, the molecular weight (Mw) is more preferably from about 1,500 to about 50,000 g/mole, and most preferably from about 1,500 to about 5,000 g/mole.

The importance in controlling the aforementioned variables can be illustrated as follows. When designing an overlay material for a variable optical attenuator, control of polyolefin composition, its molecular weight and temperature determines the refractive index of the polymer and therefore provides attenuation control of the material system. Initially, the base refractive index of the polyolefin can be controlled to be lower than that of the underlying side-polished fiber ($n_{eff}$) so that little or no attenuation of light occurs at a chosen temperature. However, as disclosed in the aforementioned U.S. patent application Ser. No. 09/026,755, when the temperature of the polymer overlay is decreased below the initial temperature, the accompanying increase in the polymer's refractive index causes attenuation of light in the fiber. More particularly, attenuation occurs when the base refractive index of the polymer is close to or higher than that of the fiber. Thus, when a material with low refractive index is overlayed on a fiber, attenuation can be induced through a change in temperature. The temperature at which attenuation begins at a particular wavelength is determined by the base refractive index of the polymer. This effect of temperature on refractive index can be used to control the variable attenuation of light in an optical fiber.

Table 2 shows the effect of polymer composition on the temperature at which attenuation begins. Table 3 shows how the molecular weight of a polyolefin (50% by weight N, N-dimethylacrylamide and 50% by weight tetrafluorophenyl acrylate) effects the temperature at which attenuation begins. The molecular weights reported in Table 3 were controlled by the addition of different amounts of 1-dodecanethiol to the polymerization reactions, as discussed below. GPC analyses of the polyolefins were performed to determine the molecular weights.

TABLE 2

| Polyolefin Description (% by weight) | Temperature at Which Attenuation Begins (° C.) |
|---|---|
| 15% dimethylacrylimide 85% tetrafluoropropylacrylate | 1 |
| 30% vinylidene chloride 70% tetrafluoropropyl acrylate | 12 |
| 50% dimethylacrylimide 50% tetrafluoropropylacrylate | 57 |
| 30% methyl methacrylate 70% pentafluoropropylacrylate | 77 |

TABLE 3

| Molecular Weight (Mw) of Polyolefin (g/mole) | Temperature at Which Attenuation Begins (° C.) |
|---|---|
| 43,654 | 57 |
| 12,368 | 46 |
| 5,269 | 36 |
| 2,055 | 30 |

Consideration will now be given to the preparation of useful polar polyolefins and the novel polymer compositions containing dye with preferred parameters and illustrative methods. Unless otherwise indicated, the reactants and reagents used in the reactions described below are readily available materials. Such materials can be conveniently prepared in accordance with conventional preparatory procedures or obtained from commercial sources. Optical characterization of the polyolefins and polymer compositions described herein was done by applying the polymer or polymer composition as an overlay on a side-polished optical fiber. Optical characterization included measurement of the temperature at which the polymer overlay caused attenuation, dispersion of the material, and range of attenuation possible. Polymer overlays were developed for variable attenuation at temperatures ranging from −1° C. to 100° C. Dispersion from 1520 to 1580 nm was controlled within slope ranges of −15 to +7 dB. In addition, it should be noted that the embodiments included and described herein are for illustrative purposes only, and the invention is in no way limited to the embodiments used in the examples.

Synthesis and Characterization of Polyolefins

The free radical polymerization of polar olefin monomers for use in the present invention may be accomplished by mixing the desired ratio of monomers with a catalyst, such as 2,2'-azobisisobutyronitrile (about 2 mole %), and a chain terminating reagent such as an alkyl thiol. As used herein, "alkyl", refers to saturated hydrocarbon residues containing twenty or fewer carbons in straight or branched chains, as well as cyclic structures. Any alkyl thiol may be used as the chain transfer agent, but due to its unobtrusive odor, 1-dodecanethiol is preferred. During the process, the alkyl portion of the aforementioned alkyl thiol detaches from the thiol moiety and attaches to each end of the polymer, thereby terminating further polymerization. The amount of the chain transfer agent added to the reaction controls the molecular weight of the polymeric product. Typically, from about 0.5 to about 20 mole % of alkyl thiol chain transfer agent is added to the mixture, with about 10 mole % being preferred. These amounts translate into polyolefins having molecular weights (Mw) that range from about 1,500 g/mole when 20 mole % 1-dodecanethiol is used to about 50,000 g/mole when 0.5 mole % is employed.

Process temperatures in the polymerization reaction are not critical and can vary widely. The polymerization reaction may be conducted at room temperature or, alternatively at elevated temperatures up to about 150° C. The polymerization is carried out in an inert atmosphere over a period of time sufficient to produce the desired polymer in adequate yield. Reaction times are influenced by the reactants, reactant temperature, the concentration of the reactants, catalyst, and other factors known to those of skill in the art. In general, reaction times can vary between about 40 minutes for preparing polyolefins at elevated temperatures and about 10 hours at room temperature.

EXAMPLE 1

A shlenk tube was charged with 40% by weight tetrafluoropropyl methacrylate (TTPMA) and 60% by weight pentafluorophenyl acrylate (PFPA), and the reaction mixture was stirred with 2,2' azobisisobutyronitrile (about 2 mole %) catalyst, 1-dodecanethiol (10 mole %) using a magnetic stir bar. The reaction vessel was cooled in a slurry of dry ice and ethanol, evacuated and blanketed with argon. The reaction vessel was heated to approximately 70° C. for 20 minutes, then heated to 100° C. for 20 minutes. The resulting polymer was stripped of any residual monomer by heating to 150° C. under vacuum for about 20 minutes. The molecular weight (Mw) of the polyolefin product, as determined by GPC, was about 4,500 g/mole.

EXAMPLE 2

The procedure of Example 1 is followed substituting 50% by weight tetrafluoropropyl acrylate (TFPA) and 50% by weight pentafluorophenyl acrylate (PFPA) for the polar olefins.

EXAMPLE 3

The procedure of Example 1 is followed substituting 40% by weight tetrafluoropropyl methacrylate (TFPMA) and 60% by weight pentafluorophenyl methacrylate (PFPMA) for the polar olefins and using 15 mole % 1-dodecanethiol as the chain transfer agent.

EXAMPLE 4

The procedure of Example 1 is followed substituting 60% by weight tetrafluoropropyl acrylate (TFPA) and 40% by weight pentafluorophenyl methacrylate (PFPMA) for the polar olefins and using 20 mole % 1-dodecanethiol as the chain transfer agent.
Synthesis and Characterization of the Polymer Composition Infrared absorbing dyes useful in the present polymer compositions include those having an absorption maximum from about 900 to about 1200 nm. However, to be useful, the dye should be soluble when added to the polyolefin. One example of a suitable dye is (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate having an absorption maximum ($\lambda_{max}$) at 1100 nm. This dye is available from Aldrich Chemical Co. and will be referred to herein as "IR1100". Other preferred dyes include those having the general formula bis[1,2-[(4-alkyl$^1$ alkyl$^2$ amino) phenyl]-1,2 -ethylenedithiolate]Met, wherein "alkyl$^1$" and "alkyl$^2$" are each independently a lower alkyl. Alkyl$^1$ and alkyl$^2$ may or may not be the same lower alkyl. As used herein, "lower alkyl", refers to saturated hydrocarbon residues containing two to eight carbons in straight or branched chains, as well as cyclic structures when possible. "Met" refers to a Group VIIIB metal, such as nickel, palladium or platinum. Bis[1,2-[(4-alkyl$^1$ alkyl$^2$ amino)phenyl]-1,2-ethylenedithiolate]Met is represented by the following structural formula (I):

(I)

It should be noted that when both alkyl$^1$ and alkyl$^2$ are the same, the nomenclature is typically altered. For example, when both alkyl$^1$ and alkyl$^2$ are butyl groups and Met is nickel, the metal complex is more commonly referred to as bis[1,2-(4-dibutylamino)phenyl)-1,2-ethylenedithiolate] nickel, rather than bis[1,2-(4-butyl butylamino)phenyl)-1,2-ethylenedithiolate]nickel. This preferred embodiment is also referred to herein as "Ni(butyl)". Ni(butyl) has an absorption maximum ($\lambda_{max}$) at 1164 nm. Another preferred dye is bis[1,2-[4-(ethyl heptyl amino)phenyl]-1,2-ethylenedithiolate]nickel, which is referred to herein as "Ni(ethyl heptyl)". The $\lambda_{max}$ for Ni(ethyl heptyl) is at 1164 nm. In addition, similar dithiolate metal complexes can be used as dyes in which platinum is substituted as the metal. Such dyes include bis[1,2-(4-dibutylaminophenyl)-1,2-ethylenedithiolate]platinum (referred to herein as "Pt (butyl)" and bis[1,2-[4-(ethyl heptyl amino)phenyl]-1,2-ethylenedithiolate]platinum ("Pt(ethyl heptyl)"), both of which have an absorption maximum ($\lambda_{max}$) at 1087 nm. The aforementioned bis(1,2-diaryl-ethylenedithiolate) metal-based complexes of structure (I) can be prepared using the method disclosed by U. T. Mueller-Westerhoffet al. in *Tetrahedron* 47, 909–932 (1991).

However, the invention is not limited to the use of the aforementioned infrared absorbing dyes, which are provided for illustrative purposes only. Other suitable dyes having the appropriate absorptions will be evident to those of skill.

The dye is added to the polyolefins described above in an amount that can vary, preferably, from about 0.2 to about 4% by weight. The addition of this amount of the dye will cause an increase in the refractive index of the composition relative to that of the base refractive index. This increase will depend on the amount and type of dye added. Preferably, for dispersion matching, an amount of dye will be added to increase the refractive index of the polymer composition (referred to herein as "material refractive index") to a value that is within about 0.5% of the effective mode refractive index of the fiber. More preferably, for dispersion matching with an optical fiber, the value of the material refractive index will be within about 0.2% of the effective mode refractive index, and most preferably, within about 0. 15%.

After addition of the dye, the polymer composition for controlling dispersion contains from about 96.0 to about 99.8% by weight of the polar olefin polymer. When IR 1100 is used as the dye, the concentration of the dye in the composition is preferably from about 1 to about 4% by weight to reach the desired material refractive index, and that of the polyolefin is preferably from about 96 to about 99% by weight. More preferably, in compositions containing IR1100 dye, the concentration of the dye is from about 1.8 to about 2.3% by weight and that of the polyolefin is from about 97.7 to about 98.2% by weight.

When either Ni(butyl) or Ni(ethyl heptyl) is included as the dye, the preferable amount of dye present in the composition is from about 0.2 to about 1.5% by weight, and the polyolefin is preferably from about 98.5 to about 99.8% by weight. More preferably, the amount of Ni(butyl) added is from about 0.7 to about 1.0% by weight, resulting in a composition that contains from about 99.0 to about 99.7% by weight polar olefin polymer. The preferable amount of dye in the composition when Ni(ethyl heptyl) is employed is from about 0.7 to about 0.9% by weight, which results in a composition that contains from about 99.1 to about 99.7% by weight polyolefin. Most preferably, for dispersion matching, the concentration of Ni(ethyl heptyl) or is about 0.82% by weight, and that of the polyolefin is about 99.2% by weight.

When either Pt (butyl) or Pt(ethyl heptyl) is the dye, the preferable amount included in the polymer composition is from about 1.8 to about 2.1% by weight, and more preferably, about 1.9% by weight.

EXAMPLE 5

The polyolefin product of Example 1 having a Mw of about 4,500 g/mole was doped with 0.82% by weight of Ni(ethyl heptyl) dye to produce a polymer composition that was dispersion matched with a glass optical fiber.

Table 4 shows the effect of dye additives to dispersion differences between a fiber optic and various exemplary polyolefin compositions. Dispersion was measured as the change in attenuation in a side-polished fiber attenuator from 1520 to 1580 nm at −15 dB attenuation.

TABLE 4

| Polyolefin Description | Dye Additive | Dispersion (dB) |
|---|---|---|
| 30 wt. % vinylidene chloride<br>70 wt. % tetrafluoropropylacrylate | none | −15 |
| 50 wt. % hexylacrylate<br>10 wt. % methyl methacrylate<br>40 wt. % tetrafluoropropylacrylate | none | −14 |
| 40 wt. % methyl methacrylate<br>60 wt. % tetrafluoropropylacrylate | none | −13.2 |
| 20 wt. % N,N-dimethylacrylamide<br>80 wt. % tetrafluoropropylacrylate | none | −11.4 |
| 40 wt. % hexylacrylate<br>20 wt. % methyl methacrylate<br>40 wt. % tetrafluoropropylacrylate | none | −8 |
| 30 wt. % methyl methacrylate<br>70 wt. % pentafluorophenyl methacrylate | 1.2 wt. %<br>Ni(ethyl heptyl) dye | −3.2 |
| 50 wt. % hexylacrylate<br>10 wt. % methyl methacrylate<br>40 wt. % tetrafluoropropylacrylate | 2.1 wt. %<br>IR 1100 dye | −1.5 |
| 40 wt. % hexylacrylate<br>20 wt. % methyl methacrylate<br>40 wt. % tetrafluoropropylacrylate | 2.1 wt. %<br>IR 1100 dye | −1.2 |
| 20 wt. % N,N-dimethylacrylamide<br>80 wt. % tetrafluoropropylacrylate | 1.87 wt. %<br>IR 1100 dye | 0.3 |
| 30 wt. % methyl methacrylate<br>70 wt. % pentafluorophenyl methacrylate | 1.5 wt. %<br>Ni(ethyl heptyl) dye | 0.5 |
| 30 wt. % vinylidene chloride<br>70 wt. % tetrafluoropropylacrylate | 1.2 wt. %<br>Ni(butyl)dye | 2.7 |
| 10 wt. % butylacrylate<br>30 wt. % methyl methacrylate<br>60 wt. % tetrafluoropropylacrylate | 2.97 wt. %<br>IR 1100 dye | 3 |

As can be seen from Table 4, varying the type and amount of dye as well as the types and amounts of polar olefins (from which the monomeric units of the polyolefins are derived) included in the polymer compositions of the present invention provides control of dispersion. Thus, in the case of attenuation, the dispersion of the polymer composition can unexpectedly be adjusted using the aforementioned infrared absorbing dyes to produce either highly disperse or spectrally flat attenuation across a broad wavelength band.

Particularly preferred polymer compositions useful for controlling or correcting dispersion of optical energy from a side-polished optical fiber are found and described below in Table 5. The exemplary compositions were prepared using the procedures of Examples 1 and 4 outlined above for forming a polar polyolefin and adding a dye to the polyolefin product. The polyolefins also included a terminating alkyl residue (C=12) appended at each end, which came from the addition of 1 to 20 mole % 1-dodecanethiol during the polymerization reaction.

TABLE 5

Preferred Polymer Compositions

| Polymer Composition | Dye Additive | Polyolefin (wt. %) | Polyolefin Monomers |
|---|---|---|---|
| (I) | IR1100<br>(~1.8 to 2.3 wt. %) | ~97.7 to 98.2 wt. % | ~20–50 wt % DMMA<br>~50–80 wt % TFPA |
| (II) | IR1100<br>(~1.8 to 2.3 wt. %) | ~97.7 to 98.2 wt. % | ~20–50 wt % DMMA<br>~50–80 wt % TFPMA |
| (III) | Ni(ethyl heptyl)<br>(~0.7–0.9 wt. %) | ~99.1–99.3 wt. % | ~50–60 wt. % PFPA<br>~40–50 wt. % TFPMA |
| (IV) | Ni(ethyl heptyl)<br>(~0.7–0.9 wt. %) | ~99.1–99.3 wt. % | ~40–70 wt. % PFPA<br>~30–60 wt. % TFPA |
| (V) | Ni(ethyl heptyl)<br>(~0.7–0.9 wt. %) | ~99.1–99.3 wt. % | ~40–70 wt. % PFPMA<br>~30–60 wt. % TFPMA |
| (VI) | Ni(ethyl heptyl)<br>(~0.7–0.9 wt. %) | ~99.1–99.3 wt. % | ~40–70 wt. % PFPMA<br>~30–60 wt. % TFPA |
| (VII) | Ni(butyl)<br>(~0.7–1.0 wt. %) | ~99.0–99.3 wt. % | ~50–60 wt. % PFPA<br>~40–50 wt. % TFPMA |
| (VIII) | Ni(butyl)<br>(~0.7–1.0 wt.%) | ~99.0–99.3 wt. % | ~40–70 wt. % PFPA<br>~30–60 wt. % TFPA |
| (IX) | Ni(butyl)<br>(~0.7–1.0 wt. %) | ~99.0–99.3 wt. % | ~40–70 wt. % PFPMA<br>~30–60 wt. % TFPMA |
| (X) | Ni(butyl)<br>(~0.7–1.0 wt. %) | ~99.0–99.3 wt. % | ~40–70 wt. % PFPMA<br>~30–60 wt. % TFPA |
| (XI) | Pt(ethyl heptyl)<br>(~1.8–2.1 wt. %) | ~97.9–98.2 wt. % | ~70–90 wt. % PFPA<br>~10–30 wt. % TFPMA |

The following abbreviations were used in Table 5:
DMMA = N,N-dimethylacrylamide
TFPA = tetrafluoroproplylacrylate
TFPMA = tetrafluoropropyl methacrylate
PFPA = pentafluorophenyl acrylate
PFPMA = pentafluorophenyl methacrylate Of the polymer compositions listed in Table 5, polymer compositions (III) and (XI) are most preferred for dispersion-matching with a fiber optic. An even more preferred embodiment of polymer composition (III) contains about 0.82 wt. % Ni(ethyl heptyl) dye and about 99.18 wt. % polar olefin polymer, wherein the polar olefin polymer comprises monomeric units derived from about 60 wt. % PFPA and about 40 wt. % TFPMA. Another even more preferred composition (XI) contains about 1.9 wt. % Pt(ethyl heptyl) dye and about 98.1 wt. % polar olefin polymer comprising monomeric units derived from about 80 wt. % PFPA and about 20 wt. % TFPMA.

Figure 3A:
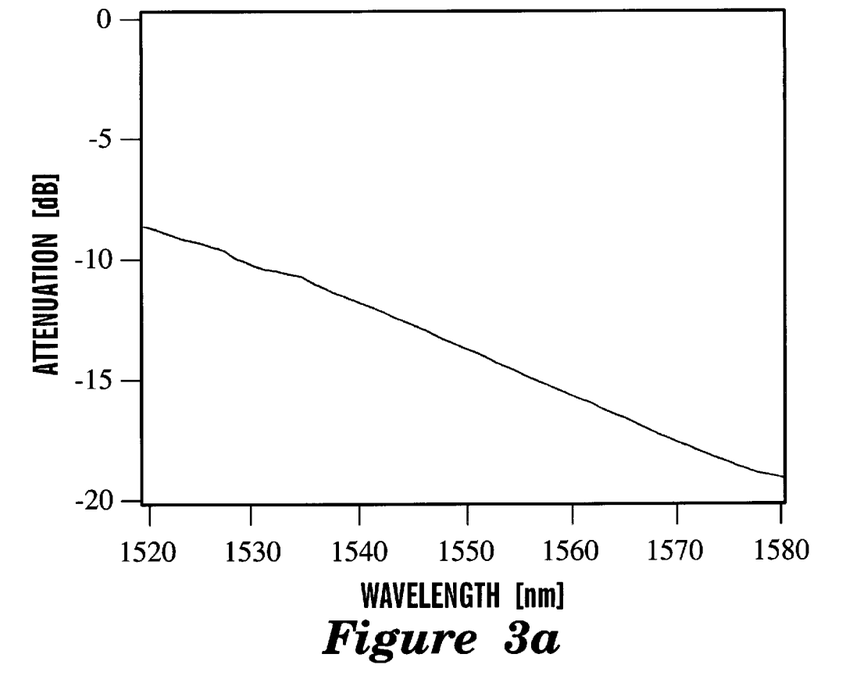
FIGS. 3a–b are respective graphs depicting the attenuation in decibels versus wavelength (nm) for a polyolefin and for the same polyolefin doped with a dye, in accordance with the present invention.
Figure 3B:
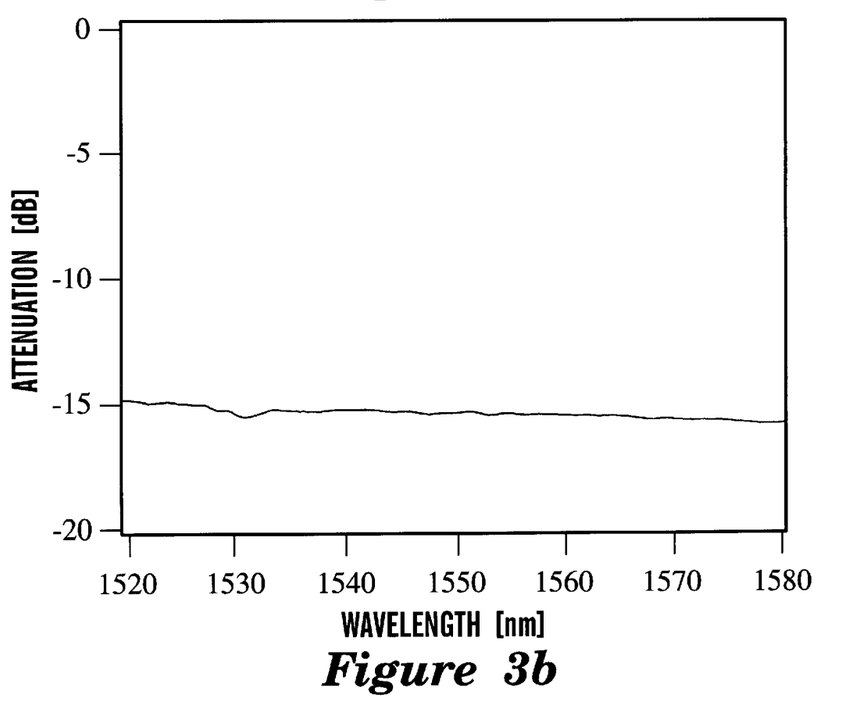

The advantages of the present polymer compositions can be seen in FIG. 3, which provides a comparison between the spectral attenuation observed for a polyolefin doped with a dye (FIG. 3b) and the same polyolefin with no dye added (FIG. 3a). As can be seen in FIG. 3a, when no dye is added to the polyolefin, the attenuation is nonuniform across the wavelengths from 1520 to 1580 nm, and there is dispersion mismatch (i.e. the dispersions are poorly matched) between the polymer and fiber optic. By contrast, as shown in FIG. 3b, when an infrared absorbing dye having an absorption maximum between 900 and 1200 nm is added to the polyolefin in the appropriate amount in accordance with the present invention, substantially uniform spectral attenuation is observed. In FIG. 3a, attenuation was measured at 7.7° C. for a polyolefin containing 40% by weight N. N-dimethylacrylamide (DMMA) and 60% by weight tetrafluorophenyl methacrylate (TFPMA). In FIG. 3b, 0.9 mole % Ni(ethyl heptyl) dye was added to the polyolefin of FIG. 3a, and attenuation was measured at 19° C. The substantially uniform attenuation shown in FIG. 3b is a result of the unexpectedly small difference in dispersion (i.e. the dispersions are substantially matched) between the polymer composition of the present invention and a fiber optic.

Figure 4A:
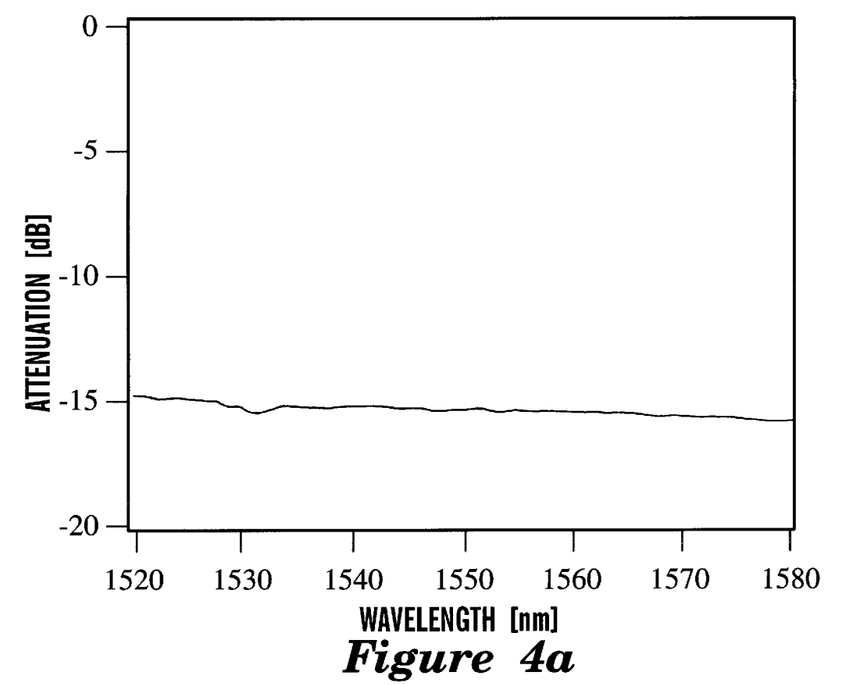
FIG. 4a is a graph depicting the uniform attenuation in decibels versus wavelength (nm) for a polyolefin doped with a dye (polymer composition), in accordance with the present invention.
Figure 4B:
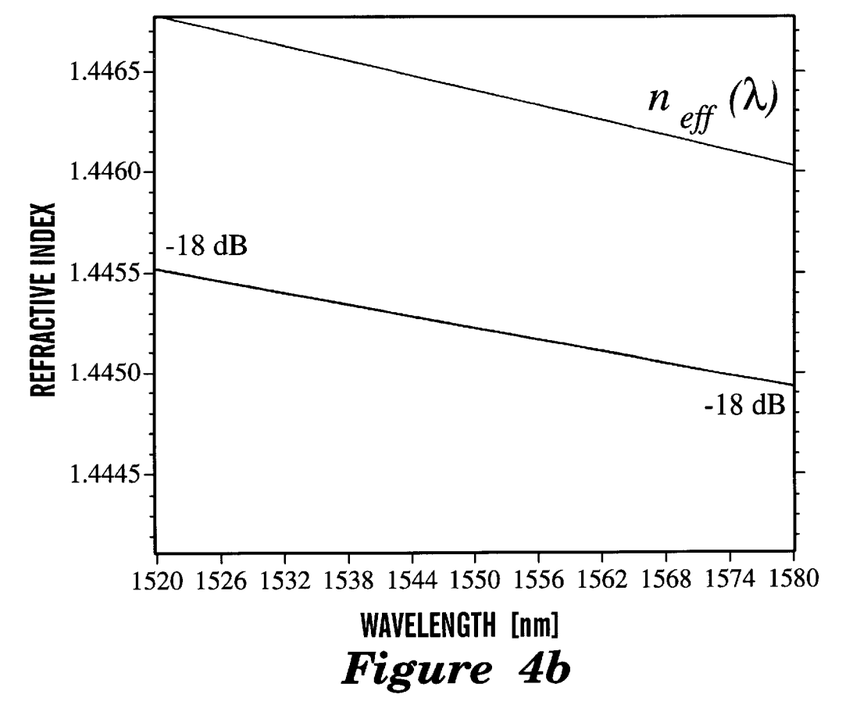
FIG. 4b is a graph of refractive index versus wavelength (nm) depicting the dispersion matching between an optical fiber and the polymer composition of FIG. 4a and also depicting the uniform attenuation in decibels versus wavelength (nm), in accordance with the present invention;.

The advantages of the present invention are also illustrated in FIGS. 4a–b. FIG. 4a shows the spectral attenuation (dB), and FIG. 4b shows the dispersion across a dispersion matched material (40 wt. % DMMA, 60 wt. % TFPMA +0.9 mole % Ni(ethyl heptyl) dye at 19° C.) on a SPF coupler in accordance with the present invention. Because the slope of the line associated with the fiber optic ($n_{eff}(\lambda)$) is substantially the same as that of the polar olefin polymer composition, as shown in FIG. 4b, the materials are said to be "dispersion-matched" or "substantially matched". When the dispersions of the optical fiber and polymer composition are substantially matched, the spectral response, i.e. attenuation, remains substantially constant across a wavelength band, e.g. 1520 to 1580 nm, as shown in FIG. 4a.

The relationship of "dispersion mismatch", which is the difference in the slopes of the refractive index versus wavelength for a material relative to a fiber optic, to variation in spectral uniformity of the performance of a side-polished fiber variable optical atttenuator is illustrated in the following Table 6. The calculations were performed using the data shown in the graphs of FIGS. 3a–b. It should be noted that the data reported in Table 6 are for illustrative purposes only, and that many variables and uncertainties will effect the information contained therein. However, because dispersion is well understood by those of skill, one of ordinary skill in the art would know if materials are substantially matched or mismatched. In addition, one of skill would be able to adjust the dispersions according to particular spectral requirements. It should also be noted that the invention is not limited to variable attenuators, but is also useful in other applications, as would be obvious to one of skill, such as in couplers and switches, for example.

TABLE 6

| Material | Index Slope [nm$^{-1}$] (1500–1600 nm) | Slope Ratio | Spectral Nonuniformity (dB/nm) |
| --- | --- | --- | --- |
| Fiber (and/or Perfectly Matched Material) | 1.167 × 10$^{-5}$ | 1.000 | 0.000 |
| "substantially Matched" Polymer | 9.167 × 10$^{-6}$ | 0.786 | 0.017 |
| "Poorly Matched" Polymer | 5.333 × 10$^{-6}$ | 0.457 | 0.167 |

As is apparent from Table 5, the attenuation from a "poorly matched" material can be more than 10 times less uniform than a "substantially matched" material.

The present invention also includes a novel method for controlling dispersion of a polymer composition relative to an optical fiber, as well as an optical device for controlling spectral response, particularly across the wavelength band of 1500–1600 nm. The present method and device incorporate the novel dispersion-controlled polymer compositions described above, which are positioned over an exposed surface of an optical fiber. As a result of incorporating the present polymer compositions into the structure, the spectral response of the device becomes controllable and can be made substantially uniform. Thus, the performance of the device in which the dispersions of the fiber and polymer composition are substantially matched is constant independent of the wavelength used. Because such a device is insensitive to the wavelength of light propagating across the fiber, the same response is observed across the entire wavelength band of interest. The technology enables dispersion mismatch between the fiber optic and polymer overlay to be controlled. Thus, for example, attenuators having constant attenuation across the wavelength band or spectral region can be designed, as well as couplers and switches.

Figure 5A:
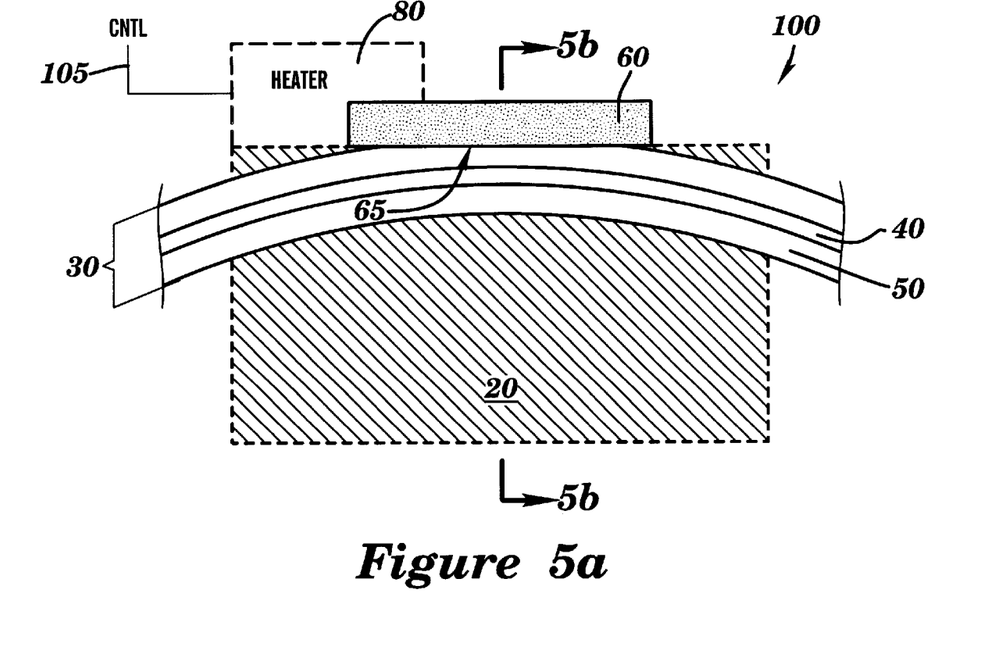
FIG. 5a is a side, cross-sectional view of an optical device depicting a side-polished optical fiber and a polymer composition, in accordance with the present invention.
Figure 5B:
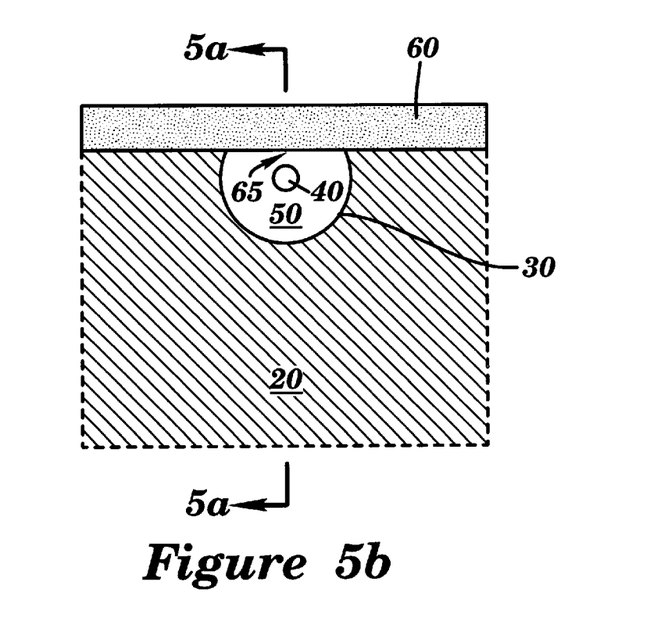

In accordance with the present invention, an optical device 100 for controlling dispersion of light typically having a wavelength from about 1500 nm to about 1600 nm is depicted in FIGS. 5a–b. In addition, the present method for controlling dispersion can best be understood with reference to the same drawings. According to the first step of the present method, a portion of a single-mode optical fiber (e.g., telecommunications Corning SMF-28) 30 is provided in which material has been removed to expose surface 65. The fiber is typically side-polished through its cladding 50 close to its core 40, thereby exposing, through surface 65, an evanescent tail of the optical energy transmitted in the fiber. The remaining cladding thickness is generally < about 10 μm. However, the invention is not limited to the use of side-polished optical fibers, and other fibers having an exposed surface may be used. Fiber 30 has an effective mode refractive index at each wavelength across the wavelength band, which, as stated above, typically includes wavelengths from about 1500 to about 1600 nm.

In the second step, novel polymer composition 60 of the present invention, which is described above, is formed over polished surface 65 of the fiber cladding. Optical energy propagating through the fiber can then be extracted from the fiber core by polymer composition 60. The polymer composition may be prepared by polymerization of two or more of the above polar olefins, followed by doping with an infrared absorbing dye, as previously described. As previously stated, the base refractive index of the polyolefin may be controlled to be lower than the effective mode refractive index of the fiber (preferably within 1%) by changing the ratio of the polar olefins polymerized or by changing the molecular weight of the polar olefin polymer.

For correction of dispersion mismatch, polymer composition 60 is formulated, as described above, to have a material refractive index that is substantially the same as the side-polished fiber's corresponding effective mode refractive index ($n_{eff}$) at each wavelength within the wavelength band. In addition, for dispersion that is substantially matched, the slope associated with the polymer composition (i.e. change in material refractive index across the wavelength band) must be substantially the same as that associated with the fiber optic (change in effective mode refractive index with wavelength). For example, to substantially match the dispersion of the fiber optic, the material refractive index preferably lies within about 0.5% of the effective mode refractive index; more preferably within about 0.2%, and most preferably, within about 0.15%. In addition, for dispersion matching, a slope which is substantially the same as that of the fiber optic is one having a value that is preferably within about 25%, for example, of the fiber optic slope.

Material dispersion of polymer composition 60, as well as the value of the material refractive index, are controlled by altering the amount of the infrared absorbing dye present in the polymer composition. Thus, the material dispersion across the wavelength band can be controlled to substantially match or mismatch the effective mode dispersion of the optical fiber. Also, addition of the dye raises the value of the material refractive index (relative to the base refractive index), and it can be controlled to lie within the aforementioned preferable percentage, if desired. Thus, the amount of dye present in the composition (as well as the composition of the polyolefin) controls the material refractive index.

In addition, the spectral response of optical device 100 across the wavelength band can be controlled by controlling the material dispersion relative to the effective mode dispersion. When the material dispersion substantially matches the effective mode dispersion, the spectral response of the device is substantially uniform. In the case of a variable optical attenuator, for example, a substantially uniform spectral response would mean that the attenuation level remains constant to within about 0.5 dB over the wavelength band of interest The method may also include the step of varying the material refractive index of polymer composition 60 to a desirable refractive index without altering the dispersion of the polymer composition 60. For example, the material refractive index may be controllably varied by controllably changing the temperature of the composition, i.e. an increase in temperature will decrease the material refractive index, and a decrease in temperature will cause an increase. Because the temperature of the polymer composition affects its material refractive index without altering the material dispersion, the amount of light propagating from side-polished fiber optic 30 to polymer composition 60, for example, can be controllably varied while maintaining uniform device performance. This is important in a variable optical attenuator where maximum optical energy can be extracted from the fiber when the material refractive index of the polymer composition is substantially the same as the fiber's effective mode refractive index. In FIG. 5*a*, a controllable heating element 80 is included with optical devide 100 for providing a changeable temperature stimulus to material 60 in accordance with a control stimulus 105.

Side-polished optical fiber 30 of FIGS. 5*a*–*b* may be fabricated by conventional lapping and polishing techniques. Using this technique, the fiber is typically embedded in a fused silica substrate block 20 containing a controlled radius groove. Material is carefully removed from a portion of fiber cladding 50 until core 40 is approached. At this point, the evanescent field of the optical energy propagating through the optical fiber can be accessed through surface 65 and propagate through polymer composition 60. The device interaction length can be controlled by the remaining cladding thickness and the groove's radius of curvature.

Alternatively, side-polished optical fiber 30 of may be fabricated without the incorporation of substrate block 20 by the technique disclosed in the aforementioned commonly assigned U.S. patent applications entitled "Blockless Fiber Optic Attenuators and Attenuation Systems Employing Dispersion Controlled Polymers" and "Blockless Techniques for Simultaneous Polishing of Multiple Fiber Optics", both of which are being filed concurrently herewith.

While the invention has been particularly shown and described with reference to preferred embodiment(s) thereof, it will be understood by those skilled in the art that various changes in form and details may be made therein without departing from the spirit and scope of the invention.

We claim:

1. A method for controlling material dispersion in a polymer composition across a wavelength band, said method comprising the steps of:
    (a) providing a portion of an optical fiber through which optical energy can propagate, wherein said portion of said optical fiber has a surface through which at least some of said optical energy can be extracted, and wherein said portion of said optical fiber has an effective mode refractive index at each wavelength of said wavelength band and an effective mode dispersion across said wavelength band;
    (b) forming said polymer composition over said surface of said portion of said optical fiber, wherein said polymer composition comprises:
        (1) an infrared absorbing dye having an absorption maximum from about 900 to about 1200 nm; and
        (2) a polar olefin copolymer comprising monomeric units derived from two or more polar olefins having an ester, benzene or halogen substituent attached thereto; and
    wherein said polymer composition has a material refractive index at each wavelength of said wavelength band and a material dispersion across said wavelength band; and
    (c) controlling said material dispersion across said wavelength band by altering the amount of said infrared absorbing dye present in said polymer composition, whereby said material refractive index at each wavelength is also controlled.

2. The method of claim 1, wherein said polymer composition is formed by the steps of:
    (i) polymerizing said two or more polar olefins having an ester, benzene, or halogen substituent attached thereto to form said polar olefin copolymer; and
    (ii) adding to said polar olefin polymer of step (i) said infrared absorbing dye having an absorption maximum from about 900 to about 1200 nm;
wherein said material dispersion and said material refractive index are controlled by altering the amount of said infrared absorbing dye added in step (ii).

3. The method of claim 1, wherein said material dispersion in said polymer composition substantially matches said effective mode dispersion in said optical fiber, wherein said material refractive index is substantially the same as said effective mode refractive index, and wherein the change in said material refractive index across said wavelength band is substantially the same as the change in said effective mode refractive index across said wavelength band.

4. The method of claim 3, wherein said material refractive index is controlled to lie within about 0.5% of said effective mode refractive index and said change in said material refractive index across said wavelength band is within about 25% of said change in said effective mode refractive index across said wavelength band.

5. The method of claim 4, wherein said material refractive index is within about 0.2% of said effective mode refractive index.

6. The method of claim 1, wherein said wavelength band is from about 1500 nm to about 1600 nm.

7. The method of claim 1, further comprising the step of altering said material refractive index to a desirable refractive index without changing said material dispersion.

8. The method of claim 7, wherein said material dispersion in said polymer composition substantially matches said effective mode dispersion in said optical fiber and said desirable refractive index is substantially the same as said effective mode refractive index.

9. The method of claim 7, wherein said desirable refractive index is obtained by controllably changing the temperature of said polymer composition formed on said optical fiber.

10. The method of claim 1, wherein each of said two or more polar olefins in step (b)(2) is selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

11. The method of claim 10, wherein said infrared absorbing dye in step (b)(1) is (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate or a dye selected from the group having the formula bis[1,2-[(4-alkyl$^1$ alkyl$^2$ amino) phenyl]-1,2-ethylenedithiolate]Met, wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

12. The method of claim 11, wherein said infrared absorbing dye is selected from the group consisting of bis[1,2-(4-dibutylaminophenyl)-1,2-ethylenedithiolate]nickel; bis[1,2-[4-(ethyl heptyl amino)phenyl]-1,2-ethylenedithiolate] nickel; bis[1,2-(4-dibutylaminophenyl)-1,2-ethylenedithiolate]platinum; and bis[1,2-[4-(ethyl heptyl amino)phenyl]-1,2-ethylenedithiolate]platinum.

13. An optical device comprising:
(a) a portion of an optical fiber through which optical energy can propagate, wherein said portion has a surface through which at least some of said optical energy can be extracted; and
(b) a polymer composition formed over said surface, wherein said polymer composition comprises:
(1) an infrared absorbing dye having an absorption maximum from about 900 to about 1200 nm; and
(2) a polar olefin copolymer comprising monomeric units derived from two or more polar olefins having an ester, benzene or halogen substituent attached thereto.

14. The optical device of claim 13, further comprising a temperature controlling circuit coupled to said polymer composition, wherein said temperature controlling circuit provides a controllable stimulus to said polymer composition to change the temperature thereof.

15. The optical device of claim 13, wherein each of said two or more polar olefins is selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

16. The optical device of claim 15, wherein said infrared absorbing dye is (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate or a dye selected from the group having the formula bis[1,2-[(4-alkyl$^1$ alkyl$^2$ amino) phenyl]-1,2-ethylenedithiolate]Met, wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

17. The optical device of claim 16, wherein said infrared absorbing dye is selected from the group consisting of bis[1,2-(4-dibutylaminophenyl)-1,2-ethylenedithiolate] nickel; bis[1,2-[4-(ethyl heptyl amino)phenyl]-1,2-ethylenedithiolate]nickel; bis [1,2-(4-dibutylaminophenyl)-1,2-ethylenedithiolate]platinum; and bis[1,2-[4-(ethyl heptyl amino)phenyl ]-1,2-ethylenedithiolate]platinum.

18. The optical device of claim 13, wherein said optical fiber has an effective mode dispersion associated therewith across a wavelength band and an effective mode refractive index at each wavelength of said wavelength band; wherein said polymer composition has a material refractive index at each said wavelength and a material dispersion across said wavelength band; and wherein said material dispersion and said material refractive index are controlled by altering the amount of said infrared absorbing dye present in said polymer composition.

19. The optical device of claim 18, wherein the spectral response of said optical device across said wavelength band is controlled by controlling said material dispersion relative to said effective mode dispersion.

20. The optical device of claim 19, wherein said spectral response is substantially uniform.

21. The optical device of claim 18, wherein said material dispersion substantially matches said effective mode dispersion, wherein said material refractive index at each said wavelength is substantially the same as said effective mode refractive index, and wherein the change in said material refractive index across said wavelength band is substantially the same as the change in said effective mode refractive index across said wavelength band.

22. The optical device of claim 18, further comprising a temperature controlling circuit coupled to said polymer composition, wherein said temperature controlling circuit provides a controllable stimulus to said polymer composition to change the temperature thereof.

23. The optical device of claim 18, wherein each of said two or more polar olefins is selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

24. The optical device of claim 23, wherein said infrared absorbing dye is (8-((3-((6,7-dihydro-2,4-diphenyl-5H-1-benzopyran-8-yl)methylene)-2-phenyl-1-cyclohexen-1-yl) methylene)-5,6,7,8-tetrahydro-2,4-diphenyl-1-benzopyrylium tetrafluoroborate or a dye selected from the group having the formula bis[1,2-[(4-alkyl$^1$ alkyl$^2$ amino) phenyl]-1,2-ethylenedithiolate]Met, wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

25. The optical device of claim 24, wherein said infrared absorbing dye is selected from the group consisting of bis[1,2-(4-dibutylaminophenyl)-1,2-ethylenedithiolate] nickel; bis[1,2-[4-(ethyl heptyl amino)phenyl]-1,2-ethylenedithiolate]nickel; bis[1,2-(4-dibutylaminophenyl)-1,2-ethylenedithiolate]platinum; and bis[1,2-[4-(ethyl heptyl amino)phenyl]-1,2-ethylenedithiolate]platinum.

* * * * *